United States Patent [19]
Van Order et al.

[11] Patent Number: 4,910,648
[45] Date of Patent: Mar. 20, 1990

[54] ILLUMINATED VISOR MOUNTING BRACKET

[75] Inventors: Kim L. Van Order, Hamilton; Kenneth D. Kreuze, Holland, both of Mich.

[73] Assignee: Prince Corporation, Holland, Mich.

[21] Appl. No.: 285,647

[22] Filed: Dec. 16, 1988

[51] Int. Cl.$^4$ .............................................. F21V 33/00
[52] U.S. Cl. .................................... 362/142; 362/135; 296/97.9
[58] Field of Search ............... 362/135, 137, 140, 142, 362/143; 296/97.9, 97.12

[56] References Cited

U.S. PATENT DOCUMENTS

| | | | |
|---|---|---|---|
| 4,000,404 | 12/1976 | Marcus | 362/135 |
| 4,227,241 | 10/1980 | Marcus | 362/61 |
| 4,486,819 | 12/1984 | Marcus et al. | 362/142 |
| 4,553,797 | 11/1985 | Marcus | 296/97.9 |
| 4,591,956 | 5/1986 | Majchrzak | 362/135 X |
| 4,683,522 | 7/1987 | Viertel et al. | 362/137 X |
| 4,702,513 | 10/1987 | Ebert et al. | 296/97.9 |
| 4,740,028 | 4/1988 | Connor | 362/142 X |

Primary Examiner—Ira S. Lazarus
Assistant Examiner—Peggy A. Neils
Attorney, Agent, or Firm—Price Heneveld Cooper DeWitt & Litton

[57] ABSTRACT

A visor mounting bracket includes a lamp housing integrally formed with the visor mounting bracket and a lens covering a lamp socket and lamp mounted therein with an electrical supply line extending through the bracket for connection to the vehicle's electrical power supply system. Such construction provides a unique dual functioning structure which provides desirable interior lighting for a vehicle at a unique location.

11 Claims, 2 Drawing Sheets

ILLUMINATED VISOR MOUNTING BRACKET

BACKGROUND OF THE INVENTION

The present invention pertains to vehicle visors and particularly to a mounting bracket for such visors.

There exists a variety of interior vehicle illumination systems including overhead dome lamps, map reading lamps positioned in the overhead consoles, and various other interior lighting. Also, for map reading purposes, illuminated vanity mirror visors have been employed as for example the type disclosed in U.S. Pat. Nos. 4,227,241 and 4,486,819.

SUMMARY OF THE PRESENT INVENTION

The system of the present invention provides a bracket for mounting a vehicle visor to a vehicle which visor may or may not be of the illuminated vanity mirror type. The bracket includes a lamp to direct light downwardly toward the seating area of a vehicle. The lamp can be activated by the normal door operating switch of a vehicle desired or by other switch means.

The system of the present invention thus comprises a visor mounting bracket which includes illumination means for directing light downwardly toward the interior of a vehicle. In the preferred embodiment of the invention, the lamp means includes a housing integrally formed with the visor mounting bracket and a lens covering a lamp socket and lamp mounted therein with an electrical supply line extending through the bracket for connection to the vehicle's electrical power supply system. Such construction provides a unique dual functioning structure which provides desirable interior lighting for a vehicle at a minimal cost and positions such lighting at a unique location heretofore not employed for such purposes. These and other features, objects and advantages of the present invention will become apparent upon reading the following description thereof together with reference to the accompanying drawings in which:

DETAILED DESCRIPTION OF THE PREFERRED EMBODIMENT

Figure 1:
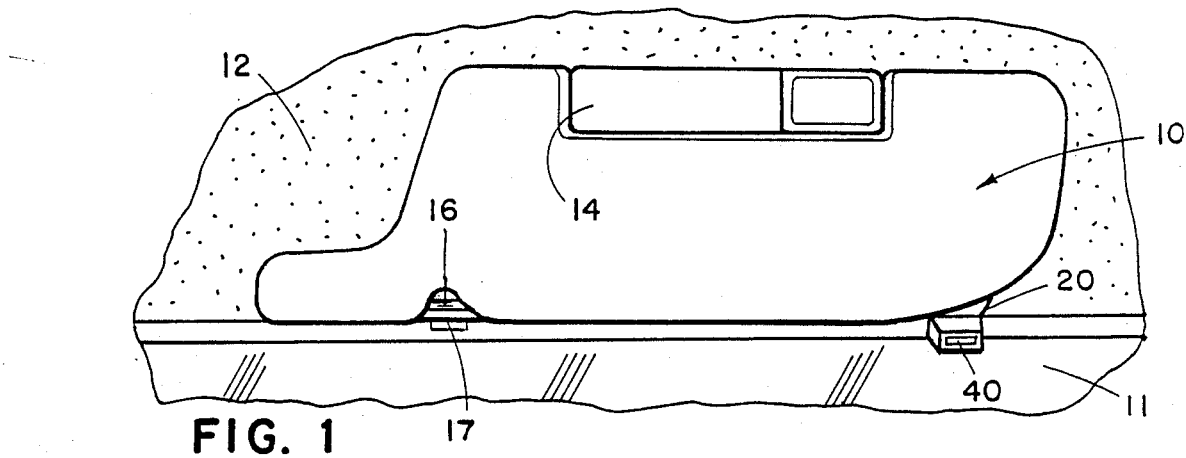
FIG. 1 is a perspective view of a visor mounted within a vehicle and incorporating the present invention.
Figure 2:
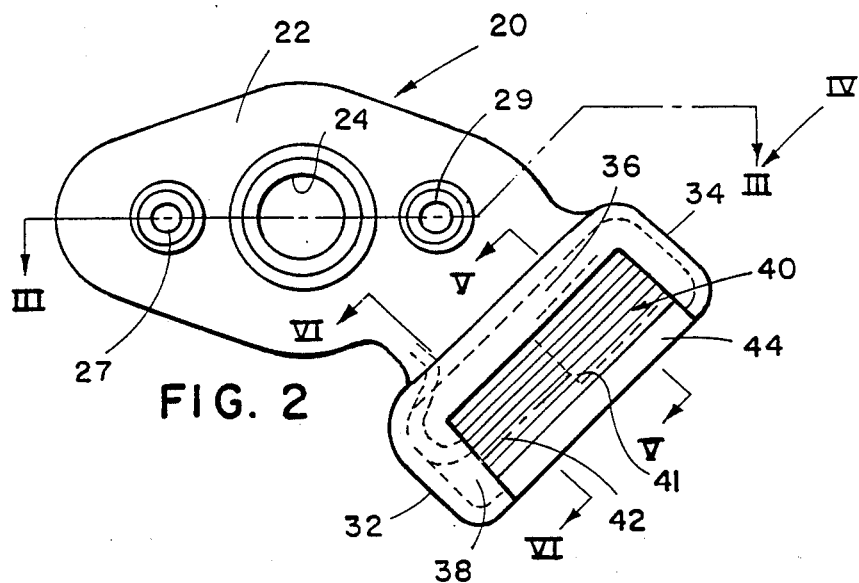
FIG. 2 is an enlarged top-plan view of a mounting bracket and light assembly embodying the present invention.

Referring initially to FIG. 1, there is shown a visor assembly 10 mounted in a vehicle at the passenger side above the vehicle windshield 11 and shown in a raised stored position against the vehicle roof 12. The visor 10 includes, in the preferred embodiment, a slide out illuminated vanity mirror package 14 which may be of the type described in U.S. Pat. No. 4,486,819 the disclosure of which is incorporated herein by reference. Visor 10 is mounted to roof 12 of the vehicle by first visor mounting bracket assembly 20 and a pin 16 which is releasably mounted to a visor receiving clip 17 located near the center of a vehicle. The visor pivot rod mounting bracket assembly 20 integrally includes, in the preferred embodiment, lamp means as described in greater detail in connection with FIGS. 2-7.

Figure 3:
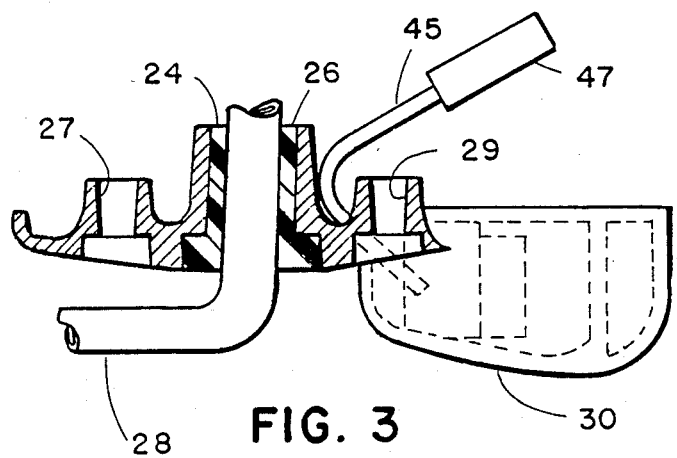
FIG. 3 is a cross-sectional view of the bracket taken along section line III—III of FIG. 2.
Figure 6:
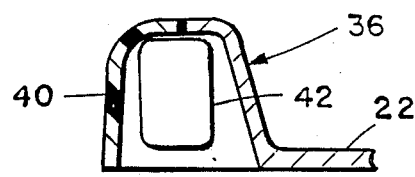
FIG. 6 is a fragmentary cross-sectional view taken along section line VI—VI of FIG. 2.
Figure 5:
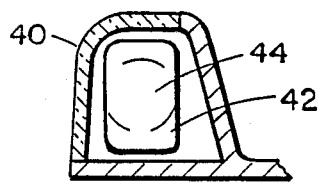
FIG. 5 is a fragmentary cross-sectional taken along section line V—V of FIG. 2.
Figure 4:
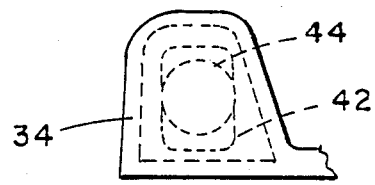
FIG. 4 is a fragmentary end-view of the bracket taken in the direction of arrow IV shown in FIG. 2.

Visor mounting bracket 20 includes a housing 22 having a central tapered aperture 24 for receiving a tapered torque fitting 26 integrally molded to a visor pivot rod 28 as shown in FIG. 3. The pivot rod 28 is hollow to accommodate an electrical conductor (not shown) for providing electrical operating power to the illuminated vanity mirror assembly 14. Housing 22 also includes a pair of recessed apertures 27 and 99 located on opposite sides of aperture 24 for receiving fastening screws for securing the bracket 20 to the roof of a vehicle utilizing suitable fastening screws.

Figure 7:
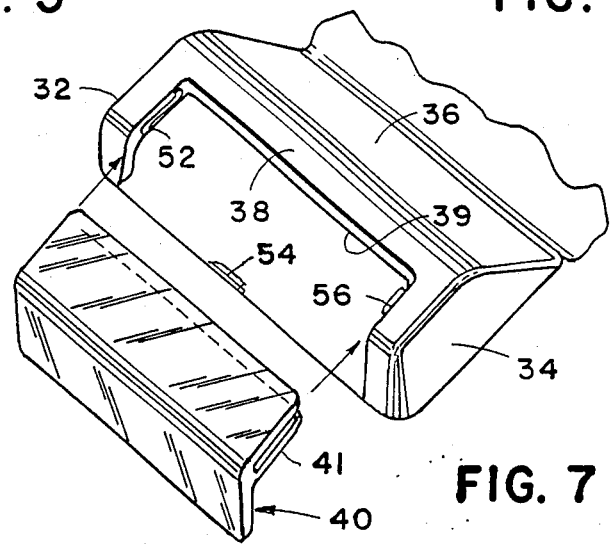
FIG. 7 is an enlarged fragmentary perspective view of a portion of the structure shown in FIG. 2.
Figure 8:
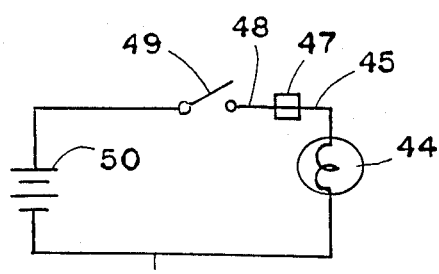
FIG. 8 is an electrical circuit diagram in schematic form showing the electrical connection of the lamp to the vehicle power supply.

Housing 22 integrally includes, in the preferred embodiment, an enlarged lamp housing 30 extending from one end adjacent aperture 29 and defining a generally rectangular enclosure having a pair of sidewalls 32 and 34, an inclined rear wall 36, and a top wall 38 having an aperture 39 formed therein as best seen in FIG. 7 for snap-receiving a lens 40. Mounted within the generally rectangular housing is a bulb socket 42 for receiving a lamp 44 with the socket having one terminal coupled to a suitable ground conductor 43 (FIG. 8) and the remaining terminal coupled to a second conductor 45 including a connector 47 for coupling to a conductor 48 associated with the vehicle's electrical supply system (FIG. 8). In the preferred embodiment conductor 48 is coupled to a door operated courtesy light switch 49 which in turn coupes to the vehicle's power supply system represented in FIG. 8 by battery 50.

As best seen in FIG. 7, opening 39 includes a plurality of outwardly projecting tabs 52, 54, and 56 for lockably receiving lens 40 which includes side slots 41 for interlocking the generally L-shaped lens 40 within the aperture 39 being held in place by tab 54 with tabs 32 and 36 fitting within slot 41. Lens 40 may be a smooth transparent or translucent polymeric material such as polycarbonate or may include facets 41 (FIG. 2) for directing light in a particular fashion such as more downwardly if desired.

By integrating the lamp housing 30 with the pivot mounting bracket housing 22, illumination means are provided at a unique location for providing interior vehicle illumination and one which is esthetically pleasing and extremely effective in providing illumination in the seating area of a vehicle. Housings 22 and 30 are, in the preferred embodiment, integrally molded of a suitable material such as a metal alloy. It is possible also to provide separate housings 22 and 30 and some other means for coupling the two such as by an overlapping flange on housing 30 which underlies housing 22 and is sandwiched between housing 22 and roof 12. It will become apparent to those skilled in the art that various other modifications to the preferred embodiment of the invention as described herein can be made without departing from the spirit or scope of the invention as defined by the appended claims.

The embodiments of the invention in which an exclusive property or privilege is claimed are defined as follows:

1. An overhead illumination system for a vehicle comprising:
   a visor for a vehicle including a pivot rod extending outwardly therefrom;
   a vehicle visor mounting bracket exterior of said visor for attaching said visor pivot rod extending from said visor to the roof of a vehicle;
   a lamp housing including a lamp mounted therein for directing illumination outwardly therefrom; and
   means for coupling said lamp housing and visor mounting bracket for positioning said lamp housing immediately adjacent said visor mounting bracket and external to said visor.

2. The apparatus as defined in claim 1 wherein said lamp housing is coupled to said mounting bracket by integrally molding said bracket and housing.

3. The apparatus as defined in claim 1 wherein said lamp housing includes lens means for directing illumination outwardly therefrom.

4. The apparatus as defined in claim 3 wherein said lamp means includes a lens receiving aperture for removably receiving said lens.

5. The apparatus as defined in claim 4 wherein said lens includes light directing facets.

6. An illuminated visor mounting bracket comprising:
   a mounting bracket housing for attachment to a vehicle roof and including means for supporting the end of a visor pivot rod external of the visor, said housing integrally including a lamp housing; and
   lamp means in said lamp housing for directing illumination outwardly from said lamp housing.

7. The apparatus as defined in claim 6 wherein said bracket housing and integral lamp housing are molded of a suitable material.

8. The apparatus as defined in claim 7 wherein said housing includes a lens receiving aperture in alignment with said lamp means.

9. The apparatus as defined in claim 8 and further including lens means mounted to said aperture.

10. The apparatus as defined in claim 9 wherein said lens means includes light directing facets.

11. The apparatus as defined in claim 10 wherein said bracket is a pivot rod mounting bracket.

* * * * *